US005204697A

United States Patent [19]

Schmidlin

[11] Patent Number: 5,204,697

[45] Date of Patent: Apr. 20, 1993

[54] IONOGRAPHIC FUNCTIONAL COLOR PRINTER BASED ON TRAVELING CLOUD DEVELOPMENT

[75] Inventor: Fred W. Schmidlin, Pittsford, N.Y.

[73] Assignee: Xerox Corporation, Stamford, Conn.

[21] Appl. No.: 576,877

[22] Filed: Sep. 4, 1990

[51] Int. Cl.[5] .............. G01D 15/06

[52] U.S. Cl. .............. 346/159; 346/1.1; 346/153.1; 346/157

[58] Field of Search .............. 346/1.1, 153.1, 157, 346/159

[56] References Cited

U.S. PATENT DOCUMENTS

| | | | |
|---|---|---|---|
| 4,463,363 | 7/1984 | Giendlach et al. | 346/159 |
| 4,524,371 | 6/1985 | Sheridon et al. | 346/159 |
| 4,647,179 | 3/1987 | Schmidlin | 355/3 DD |
| 4,660,059 | 4/1987 | O'Brien | 346/157 |
| 4,731,634 | 3/1988 | Stark | 355/3 TR |
| 4,837,591 | 6/1989 | Snelling | 346/159 |
| 4,847,655 | 7/1989 | Parker et al. | 355/210 |
| 4,879,194 | 11/1989 | Snelling | 430/53 |
| 4,884,080 | 11/1989 | Hirahara et al. | 346/76 PH |
| 4,910,603 | 3/1990 | Hirahara et al. | 358/298 |
| 4,959,286 | 9/1990 | Tabb | 430/45 |
| 4,984,021 | 1/1991 | Williams | 355/245 |
| 4,990,955 | 2/1991 | May et al. | 355/208 |
| 4,998,139 | 3/1991 | May et al. | 355/208 |
| 5,021,838 | 6/1991 | Parker et al. | 355/328 |
| 5,030,531 | 7/1991 | Goodman | 430/45 |

*Primary Examiner*—Benjamin R. Fuller
*Assistant Examiner*—Randy W. Gibson

[57] ABSTRACT

A functional color graphic printer wherein Traveling Cloud Development (T.C.D.) is utilized for developing Ionographically formed color images. The high sensitivity and scavengeless character of the T.C.D. process enables the use of a low voltage imaging system such as ion deposition processes such as CorJet or IBIS or IBIS II to form three or more latent images simultaneously or sequentially on a single dielectric receiver. The charge levels of the elements of the latent images may been varied in order to produce different color intensities for each component of a composite image. Alternatively, the different color intensities can be achieved by changing the electrical biases applied to the traveling cloud developer systems.

6 Claims, 1 Drawing Sheet

IONOGRAPHIC FUNCTIONAL COLOR PRINTER BASED ON TRAVELING CLOUD DEVELOPMENT

BACKGROUND OF THE INVENTION

This invention relates to functional color graphic printing and more particularly to the use of Travelling Cloud Development (T.C.D.) for developing Ionographically formed latent images.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing uses ions deposited on an electroreceptor. In ionographic devices such as that described in U.S. Pat. No. 4,524,371 granted to Sheridon et al. or U.S. Pat. No. 4,463,363 granted to Gundlach et al., an ion producing device generates ions to be directed past a plurality of modulation electrodes to an imaging surface. In one type of ionographic device, ions are produced at a coronode supported within an ion chamber, and a moving fluid stream entrains and carries ions produced at the coronode out of the chamber. At the chamber exit, a plurality of control electrodes or nibs are modulated with a control voltage to selectively control passage of ions through the chamber exit. Ions directed through the chamber exit are deposited on a charge retentive surface in imagewise configuration to form an electrostatic latent image developable by electrostatographic techniques for subsequent transfer to a final substrate. The arrangement produces a high resolution non-contact printing system. Other ionographic devices exist which operate similarly, but do not rely on a moving fluid stream to carry ions to a surface.

U.S. Pat. No. 4,879,194 granted to Christopher Snelling discloses a method and apparatus using ion projection to form a tri-level latent image on a charge retentive surface. The tri-level image described therein comprises two image areas and a background area, the former of which are developed using magnetic brush development.

U.S. Pat. No. 4,647,179 granted to Fred W. Schmidlin discloses toner transporting apparatus for use in developing powder images on an imaging surface such a photoconductive belt. The apparatus is characterized by the provision of a travelling electrostatic wave conveyor for transporting toner particles from a supply of toner to the imaging surface. The conveyor comprises a linear electrode array consisting of spaced apart electrodes to which a multiphase AC voltage is connected such that adjacent electrodes have phase shifted voltages applied thereto which cooperate to form a travelling wave.

U.S. Pat. No. 4,731,634 granted to Howard M. Stark discloses a method and apparatus for rendering latent electrostatic images visible using multiple colors of dry toner or developer for developing black and at least two highlight color images in a single pass of the imaging surface through the development stations of the apparatus. Two of the toners are attracted to only one charge level on the charge retentive surface to form the black and one highlight color image and two toners are attracted to a third image level to form the second highlight color.

U.S. Pat. No. 4,660,059 granted to John F. O'Brien discloses an apparatus in which a document is printed in at least two different colors. Ions are projected onto the surface of a receiving member to record at least two electrostatic latent images thereon. Each of the electrostatic latent images recorded on the receiving member is developed with different color marking particles. The different color marking particles are transferred substantially simultaneously from the receiving member to the document to print the desired information thereon.

BRIEF SUMMARY OF THE INVENTION

The present invention provides a functional color graphic printer through the combined use of ionography and Traveling Cloud Development (T.C.D.). The high sensitivity and scavengeless character of the T.C.D. process enables the use of a low voltage imaging systems such as ion deposition devices such as CorJet or IBIS or IBIS II to form a composite image having three or more image components at different charge levels. The multiple-image components can be formed simultaneously or sequentially on a single dielectric receiver. Corjet is an acronym for a recording device for electrography wherein corona discharge, air breakdown ions are modulated with low voltages and mechanically accelerated with a nozzle or airjet column. IBIS is an acronym for a printing process utilizing an Image Bar Ion Stream in which charges generated by a corona wire are swept by gas flow through a slot after which the charges strike an image receiver. IBIS II is an acronym for a device for use in ionographic printing in which electrostatic fields drive ions through a slit instead of relying on entrapment in pressurized air as in the case of Corjet and IBIS. The corona cavity is designed to focus all ions toward the slit where ion passage is gated. Each color pattern to be generated is formed in a different voltage range. For example, for the black image the image receiver is charged to 350 volts, for the red image it is charged to 250 volts, and for the yellow image it is charged to 150 volts. The images of these different strengths can be formed simultaneously with IBIS or Corjet by gating the image bar to deposit the correct amount of charge for each color. Alternatively, the multiple charge level image can be made with three print bars or by revolving a dielectric drum-type receiver past the same print bars three times.

To develop the three level image, it is passed sequentially through three T.C.D. development stations. The development housings for the different colors are biased to the levels appropriate to produce the desired colors. For example, to produce the black, red, and yellow images the image transits through cyan, magenta, and yellow development stations in that order with the cyan housing biased to +300 volts, the magenta housing to +200 volts, and the yellow housing to +100 volts. Another subset of color can be obtained by physically rearranging the order of the development housings by simply plugging them into the three positions in the desired order.

While the color gamut attainable by foregoing is highly restricted the process is simple, fast and inexpensive. However, by the addition of more complexity, and in some cases a modest sacrifice in speed, the color gamut can be greatly extended to approach the total gamut attainable by the pigment set available. First, different amounts of pigment can be deposited by adjusting the charge level of the latent image within the range available for the given color (e.g. to sub-increments of 100 volts). The intensity level for a given color is also adjustable by changing the development system bias.

Another extension in color gamut that can be achieved is to use cut sheet dielectric paper or a transfer device, which will allow the dielectric to pass through the developer stations multiple times with only one housing biased for development each time.

Another modification which completely opens the color gamut attainable with a given pigment set is the incorporation of additional print bars, one each before each development station. This way each color can be added independently. Scorotrons are employed to smooth or neutralize the image charge level prior to passing the print bars.

The use of IBIS-II, instead of IBIS, or Corjet provides the advantage that it would preclude the disturbance of previously deposited toner by an air stream.

An Electronic Subsystem (ESS) processes information to be printed and conditions the print bar structure or structures for printing at the appropriate times. The image charge levels and development systems biases are also controlled by the ESS.

DETAILED DESCRIPTION OF THE PREFERRED EMBODIMENT OF THE INVENTION

Figure 1:
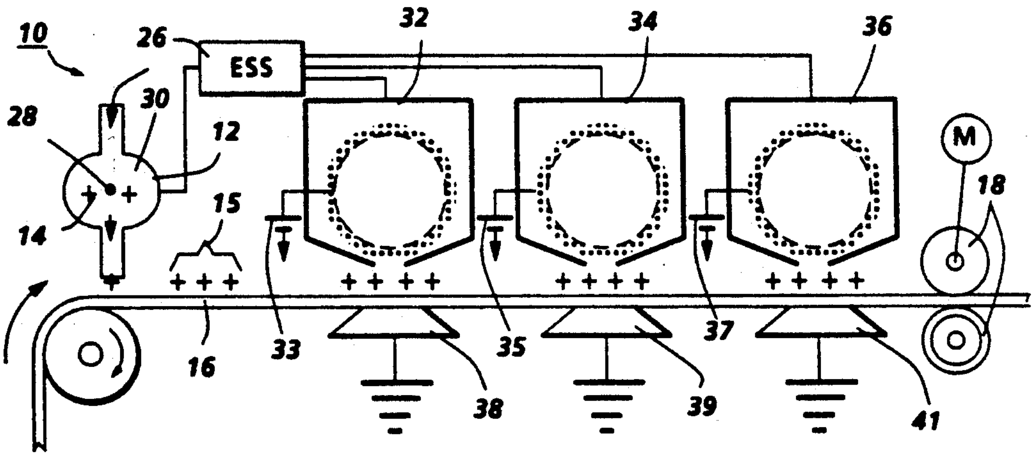
FIG. 1 is a schematic illustration of a color printing apparatus according to the invention.

Disclosed in FIG. 1 is one embodiment of a color printing device generally indicated by reference character 10.

The printing apparatus 10 includes an ionographic printhead structure 12 for generating positive ions 14 to form latent electrostatic images 15. The ions are deposited in image configuration on an image receptor such as a dielectric paper web 16. The print bar structure may comprise a device such as CorJet, IBIS or IBIS II to form three or more latent image components simultaneously on the image receiver 16. Corjet is an acronym for a recording device for electrography wherein corona discharge, air breakdown ions are modulated with low voltages and mechanically accelerated with a nozzle or airjet column. IBIS is an acronym for a printing process utilizing an Image Bar Ion Stream in which charges generated by a corona wire are swept by gas flow through a slot after which the charges strike an image receiver. IBIS II is an acronym for a device for use in ionographic printing in which electrostatic fields drive ions through a slit instead of relying on entrapment in pressurized air as in ht case of Corjet and IBIS. The corona cavity is designed to focus all ions toward the slit where ion passage is gated.

Each latent color pattern of a composite, multiple-level image to be generated is formed at a different charge level selected from a range of voltages. For example, to form a black image component the image receiver may be charged to 350 volts, for the red image component it may be charged to 250 volts, and the yellow image component may be charged to 150 volts. The image components of these different strengths are formed simultaneously with IBIS or Corjet by gating the image bar to deposit the correct amount of charge for each color. The information for gating the passage of ions from the print bars in the desired informational form is provided by an Electronic Subsystem (ESS) 26. The ESS also provides suitable electrical power to a coronode 28 supported within an ion chamber 30 of the print bar structure 12.

To develop the three level image, it is passed sequentially through three development stations having T.C.D. developer systems 32, 34 and 36 disposed thereat. T.C.D. systems which are the functional equivalent to that disclosed in the '179 patent are utilized. Each developer system is highly sensitive. Thus, they are capable of depositing single component, insulative toner with a net image potential as low 50 volts (i.e. 150 volt image potential−100 volt development bias). A development bias of at least +100 volts is necessary to insure white background in non-image areas. Also, these types of developer systems are scavengeless (i.e. non-interactive with already deposited toner) development systems which present a different color toner to the image components of the composite image. For example, system 32 may utilize cyan toner, system 34 may use magenta toner and system 36 may use yellow toner. The development systems for the different colors of toner are biased to levels appropriate to produce the desired color. For example, to produce the black, red, and yellow images the image transits through the cyan, magenta, and yellow development stations in that order with the cyan system biased to +300 volts, the magenta system to +200 volts, and the yellow system to +100 volts. Another subset of color could be obtained by physically rearranging the order of the development housings by plugging them into the three positions in the desired order. The latent electrostatic image 15 formed on the image receptor is transported via feed rollers 18 past developer systems 32, 34 and 36.

With the developer system 32 biased to +300 volts via power source 33, a net image potential of 50 (350 image voltage +300 volt bias) volts is established between that developer system and the black image component and biasing electrode 38. Thus, a quantity of cyan toner is deposited on the black image component in accordance with the strength (i.e. 50 volts) of the net image potential. This image is neutralized due to development to approximately 250 volts. Thus, when it passes the magenta toner system a 50 (250 volts−200 volt bias provided via power source 35) volt net image potential is created between the development system 34 and a biasing electrode 39 thereby effecting deposition of magenta toner on the black image component. The black image is again neutralized via the magenta development step resulting in a black image component of 150 volts. As the black image component passes through the yellow development system, a 50 volt net image potential exists due to the biasing via power source 37 thereby causing 100 volts worth of yellow toner to be deposited on top of the already deposited cyan and magenta toners thereby bringing the resultant potential image of the black image to −50 volts. A biasing electrode 41 is provided in connection with the development system 36.

With the developer system 32 biased to +300 volts, a negative equivalent net image potential exists as the red component of the image (250 volts) 15 passes through the developer system 32, therefore, almost no cyan toner is deposited on this image component. However, since a 50 volt net image potential exists as the red component of the image passes through the development systems 34 and 36 equal amounts of magenta and yellow toners are deposited on this image component.

When the yellow image component (+150 volts) passes through the development systems 32 and 34 there are cleaning fields established which prevent development. Thus, no cyan and almost no magenta toner is deposited on this image. But since there is a 50 volt net image potential in the presence of the yellow development system 36 yellow toner is deposited on this image component.

In accordance with the features of the invention, the voltage or charge levels of the image components may be modified in order to change the color intensities of the individual components of the three level image. Using the same development system biases as in the forgoing example and changing the image charge levels results in different net image potentials being established between the image components and the biased developer systems as the image components pass therethrough. Consequently, image components having different hues from those of the foregoing example may be created.

Figure 2:
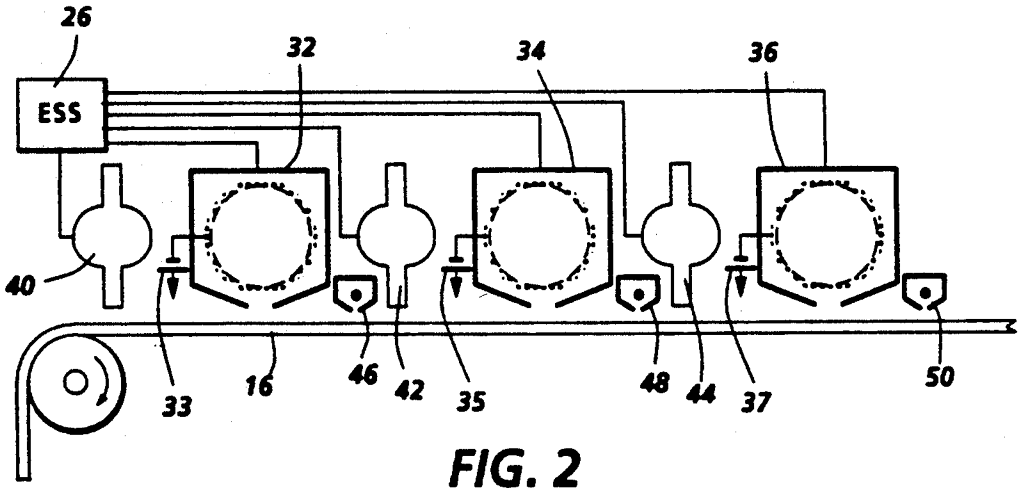
FIG. 2 is a schematic of a modified embodiment of the invention of FIG. 1.

A modified form of the invention is illustrated in FIG. 2. As disclosed therein, a plurality of ionographic print bar structures 40, 42 and 44 are employed. The three print bar structures are positioned upstream of the developer systems 32, 34 and 36. By the provision of an individual print bar for each development system color can be added independently. Scorotrons 46 and 48 are utilized to smooth or neutralize the image charge level prior to passing each print bar.

Figure 3:
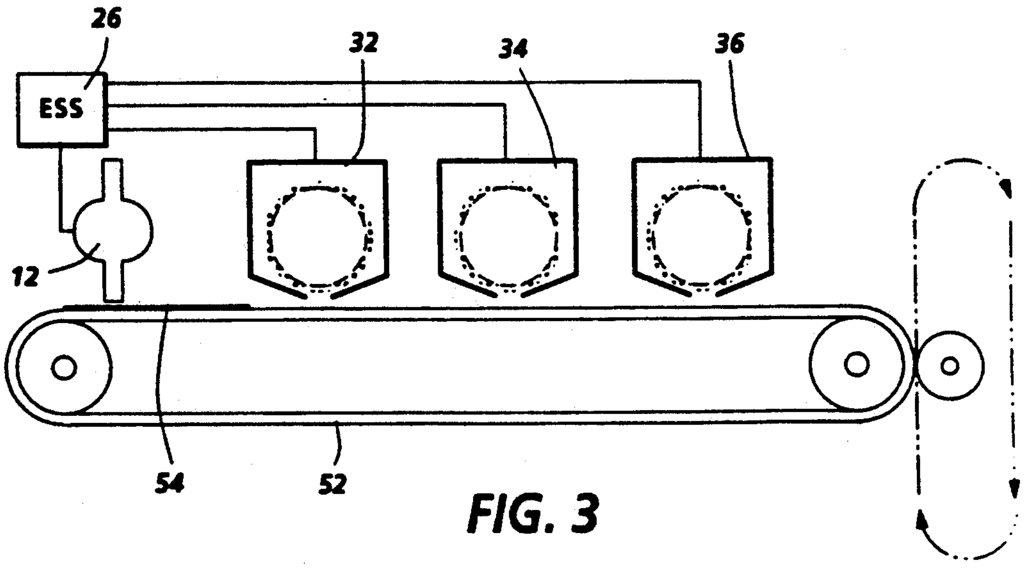
FIG. 3 is still another modification of the embodiment of the of FIG. 1.

A further modification of the invention, as shown in FIG. 3, uses a single pint bar 12 and developer systems 32, 34 and 36 as in the case of the embodiment of FIG. 1 but instead of the web 16 used in that embodiment, a transport belt 52 is used to move cut sheet 54 of dielectric paper past the three development systems multiple times with only one of the developer systems being biased for development with only one of the toners for each pass. Toner deposition from the unused development systems in a given pass can be prevented by biasing the development systems to a voltage in excess of the image potential plus 100 volts. In this embodiment, the order of toner deposition is readily changed as desired.

A heat and pressure fuser, not shown, permanently affixes toner powder images to the image receivers. Preferably, the fuser assembly includes a heated fuser roller adapted to be pressure engaged with a back-up roller with the toner powder images contacting the fuser roller. In this manner, the toner powder image is permanently affixed to an image receiver.

What is claimed is:

1. A method of printing color images using relatively low image potentials, said method including the steps of:

using ionographic imaging structure, forming a relatively low voltage, latent image on an image receiver, said relatively low voltage being about 350 volts;

passing said latent electrostatic image past means for developing said latent electrostatic image with toner; and electrically biasing said developing means for establishing a relatively low, net image potential of about 50 volts between said developing means and said latent image for effecting toner deposition on said latent image from said developing means.

2. The method according to claim 1 wherein said step of forming a latent image on said image receiver forms a latent electrostatic image having three discreet, relatively low voltage image levels and said developing means includes three developer structures and wherein each developer structure is electrically biased such toner from each of them is deposited on one of said three discreet, relatively low voltage image levels, said relatively low voltage image levels being in the order of 150 to 350 volts.

3. The method according to claim 2 wherein toner is deposited on another of said image levels from two of said developer structures.

4. The method according to claim 3 wherein toner is deposited on still another of said image levels from only one of said developer structures.

5. The method according to claim 1 including the steps of neutralizing the developed latent image and using a second ionographic imaging structure, forming a second latent electrostatic image on top or said developed latent image and forming a second developed image by developing said second latent electrostatic image using a second developing means.

6. The method according to claim 5 including the steps of neutralizing the second developed latent image and using a third ionographic imaging structure, forming a third latent electrostatic image on top of said second developed image and using a third developer means developing said third latent image.

* * * * *